(12) United States Patent
Bae et al.

(10) Patent No.: US 12,463,234 B2
(45) Date of Patent: Nov. 4, 2025

(54) FORMATION DEVICE OF POUCH-TYPE BATTERY CELL

(71) Applicant: LG ENERGY SOLUTION, LTD., Seoul (KR)

(72) Inventors: Hyun Woo Bae, Daejeon (KR); Jin Soo Lee, Daejeon (KR); Ho Jung Lee, Daejeon (KR); Young Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/861,046

(22) PCT Filed: Sep. 5, 2023

(86) PCT No.: PCT/KR2023/013281
§ 371 (c)(1),
(2) Date: Oct. 28, 2024

(87) PCT Pub. No.: WO2024/054013
PCT Pub. Date: Mar. 14, 2024

(65) Prior Publication Data
US 2025/0309319 A1    Oct. 2, 2025

(30) Foreign Application Priority Data
Sep. 6, 2022    (KR) .................. 10-2022-0113045

(51) Int. Cl.
*H01M 10/04*    (2006.01)
*H01M 4/04*    (2006.01)
(Continued)

(52) U.S. Cl.
CPC ..... *H01M 10/0404* (2013.01); *H01M 4/0445* (2013.01); *H01M 50/105* (2021.01); *H01M 50/184* (2021.01)

(58) Field of Classification Search
CPC .......... H01M 10/0404; H01M 4/0445; H01M 50/105; H01M 50/184
See application file for complete search history.

(56) References Cited

U.S. PATENT DOCUMENTS 10,741,823 B2    8/2020   Hong et al.
2007/0072071 A1*  3/2007   Lee ..................... H01M 50/627
                                                   29/623.1
(Continued)

FOREIGN PATENT DOCUMENTS

JP    2017-69079 A        4/2017
KR    2011061293 A    *   6/2011
(Continued)

OTHER PUBLICATIONS

International Search Report (PCT/ISA/210) issued in PCT/KR2023/013281, dated Dec. 8, 2023.
(Continued)

*Primary Examiner* — Bayan Salone
(74) *Attorney, Agent, or Firm* — Birch, Stewart, Kolasch & Birch, LLP

(57) ABSTRACT

An aspect of the current disclosure may include a formation device of a pouch-type battery cell. The formation device of a pouch-type battery cell may include a charging part configured to charge a battery cell, a loading buffer part, an unloading buffer part, a hole processing part configured to form a discharge hole in a gas pocket part of a battery cell, and a sealing part configured to seal the discharge hole of the battery cell. The battery cell waits on the loading buffer part before being placed into the charging part, and wherein the battery cell waits on the unloading buffer part after the battery cell has been charged and removed from the charging part.

12 Claims, 10 Drawing Sheets

(51) Int. Cl.
*H01M 50/10* (2021.01)
*H01M 50/105* (2021.01)
*H01M 50/184* (2021.01)

(56) References Cited

U.S. PATENT DOCUMENTS

| | | | |
|---|---|---|---|
| 2020/0403263 A1 | 12/2020 | Bae et al. | |
| 2022/0077537 A1* | 3/2022 | Kim | H01M 50/317 |
| 2022/0278352 A1 | 9/2022 | Hong et al. | |

FOREIGN PATENT DOCUMENTS

| | | | | |
|---|---|---|---|---|
| KR | 10-2013-0024807 A | | 3/2013 | |
| KR | 20130024807 A | * | 3/2013 | ........... G01R 31/382 |
| KR | 10-2015-0013245 A | | 2/2015 | |
| KR | 20150013245 A | * | 2/2015 | .......... H01M 50/105 |
| KR | 10-2015-0037077 A | | 4/2015 | |
| KR | 2015037007 A | * | 4/2015 | |
| KR | 10-2018-0095982 A | | 8/2018 | |
| KR | 2018095982 A | * | 8/2018 | |
| KR | 10-2019-0074591 A | | 6/2019 | |
| KR | 2019074591 A | * | 6/2019 | |
| KR | 102119551 B1 | * | 6/2020 | .......... H01M 10/441 |
| KR | 10-2021-0016775 A | | 2/2021 | |
| KR | 10-2021-0089027 A | | 7/2021 | |
| KR | 10-2021-0109896 A | | 9/2021 | |
| KR | 10-2021-0139082 A | | 11/2021 | |
| KR | 10-2416581 B1 | | 7/2022 | |
| KR | 10-2022-0111030 A | | 8/2022 | |
| WO | WO-2021025337 A1 | * | 2/2021 | .......... H01M 50/317 |
| WO | WO-2021141311 A1 | * | 7/2021 | ........ H01M 10/0404 |
| WO | WO-2021172857 A1 | * | 9/2021 | ........ H01M 10/0525 |
| WO | WO-2021230536 A1 | * | 11/2021 | .......... H01M 50/325 |
| WO | WO-2022164032 A1 | * | 8/2022 | .......... H01M 10/446 |

OTHER PUBLICATIONS

Extended European Search Report for European Application No. 23863480.2, dated Aug. 21, 2025.

* cited by examiner

[FIG. 1]
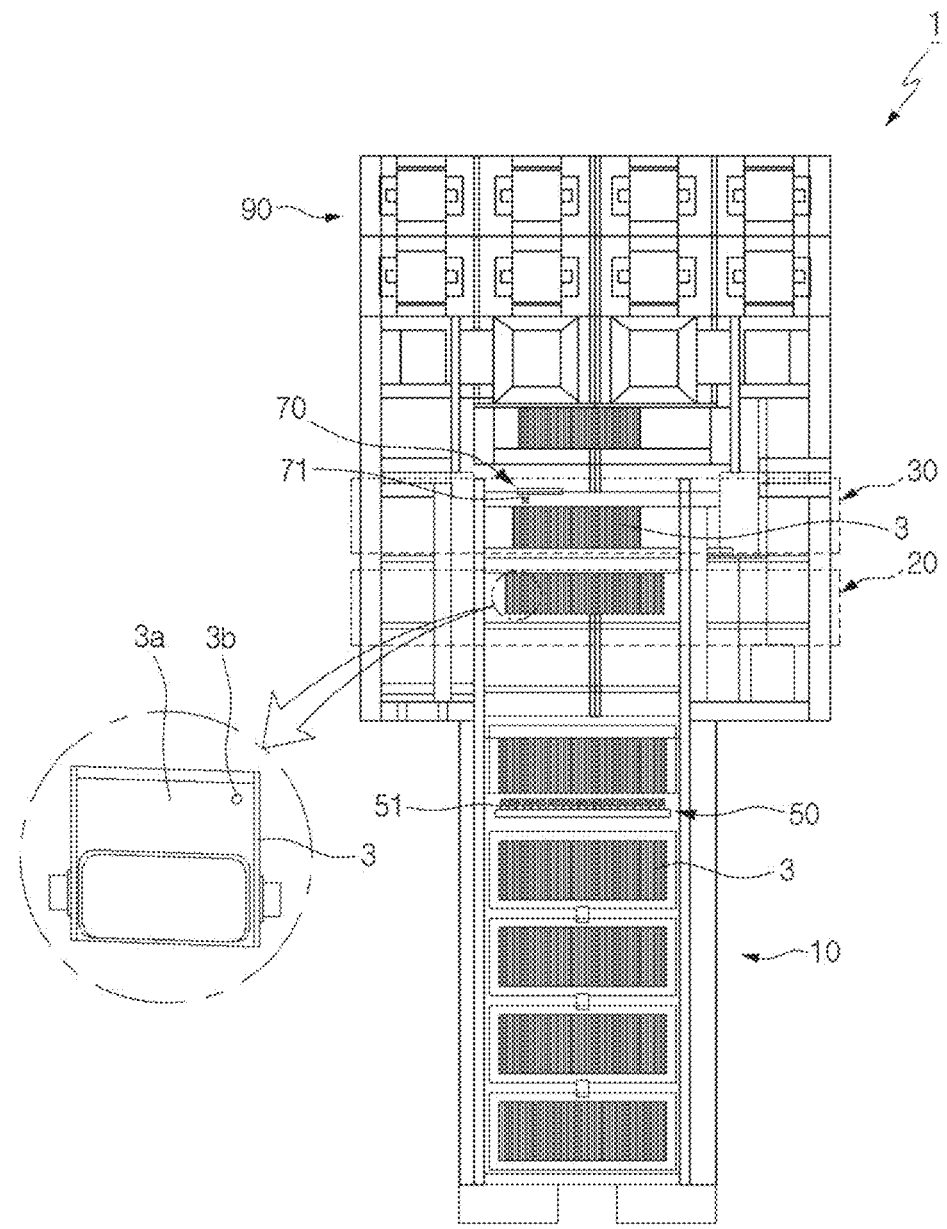

[FIG. 2]
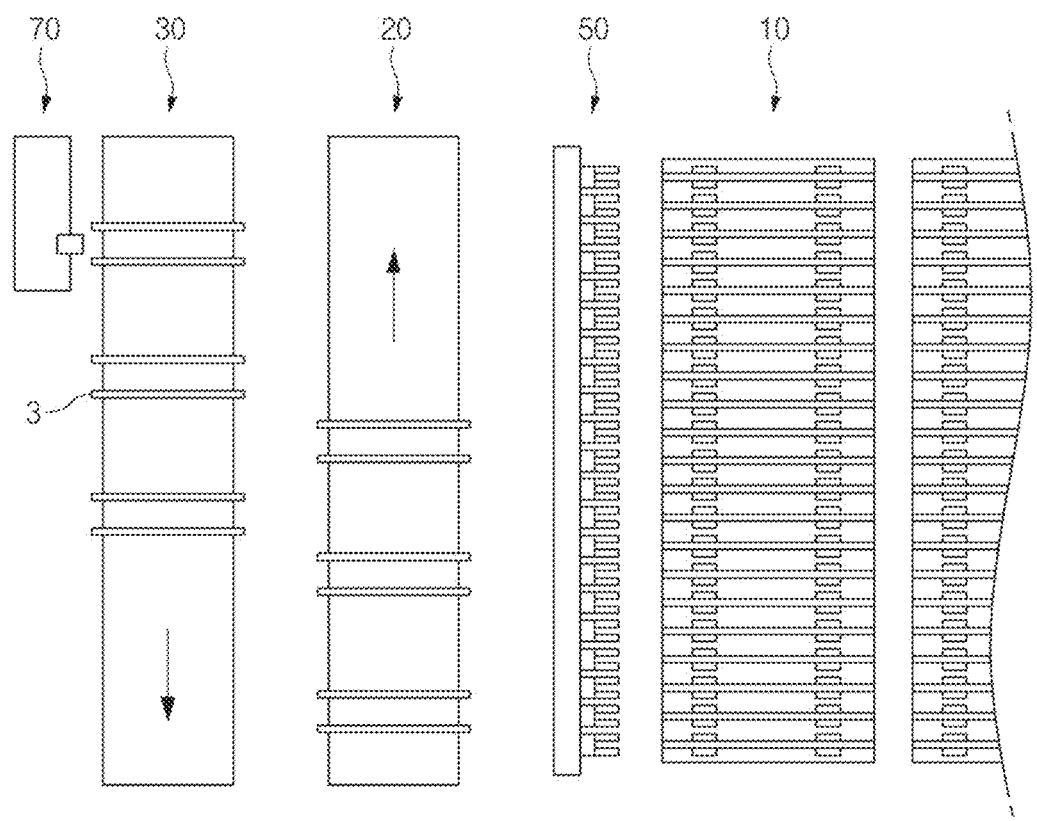

[FIG. 3]
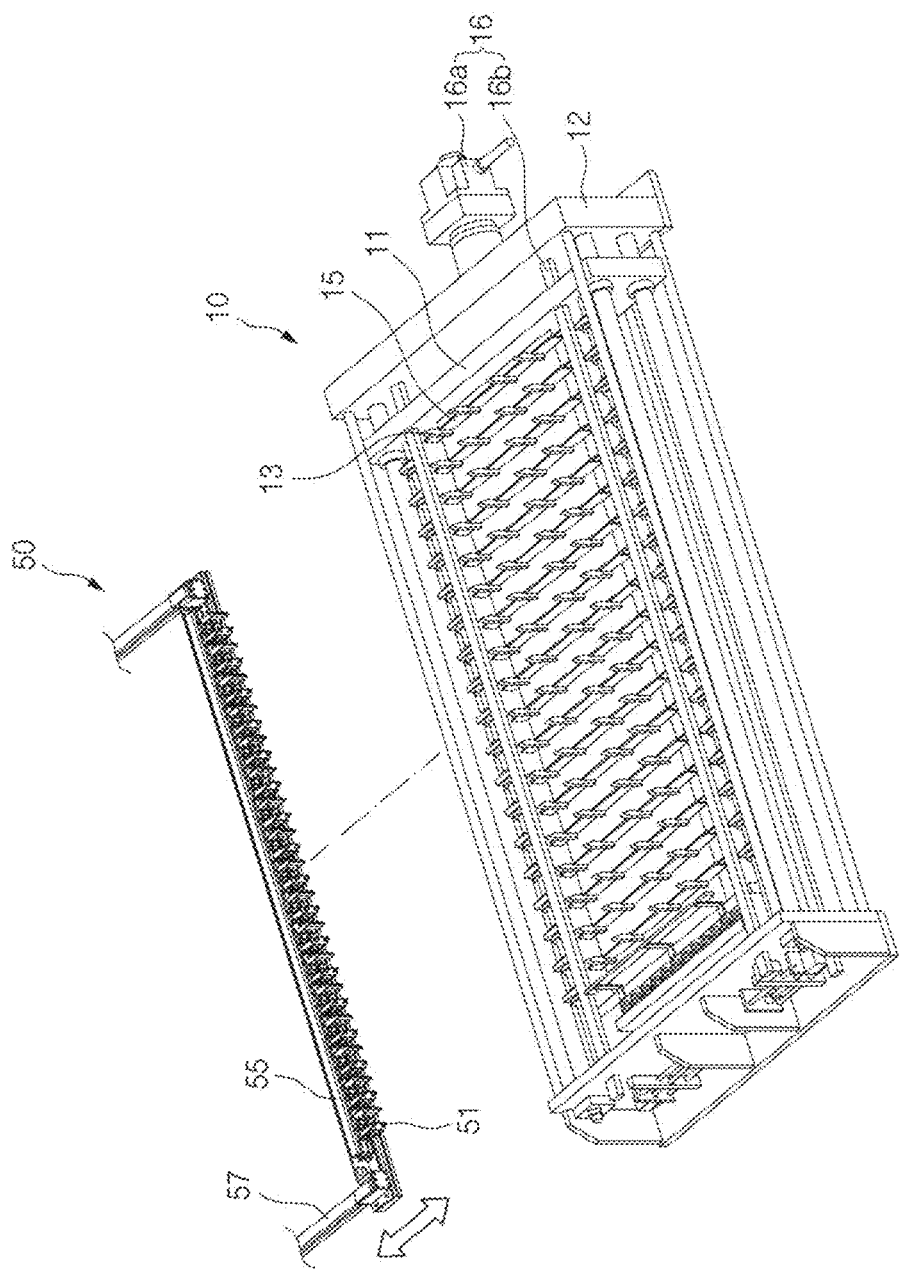

[FIG. 4]
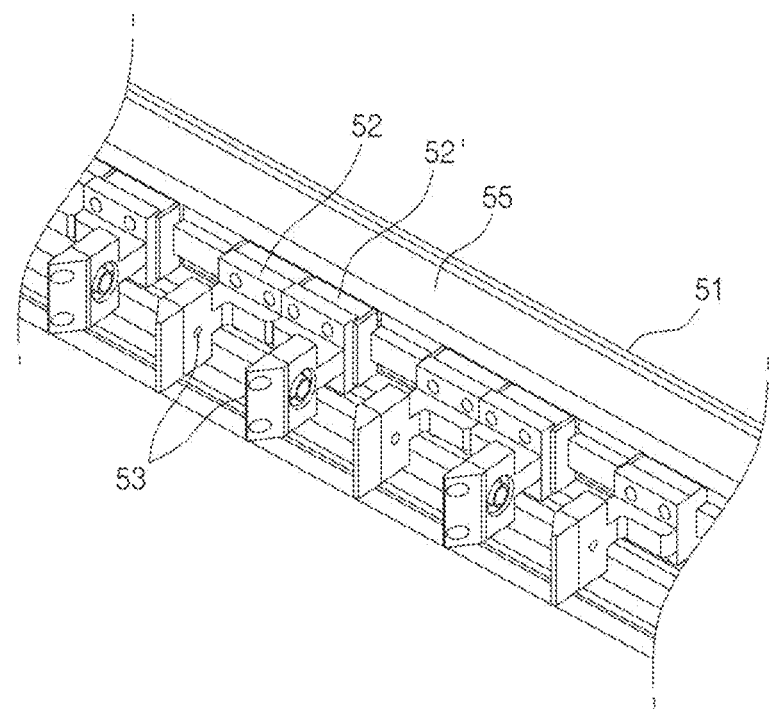

[FIG. 5]
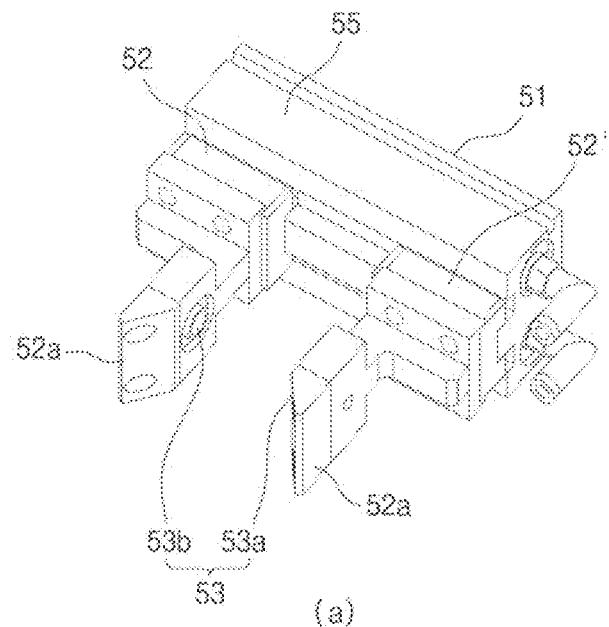
(a)
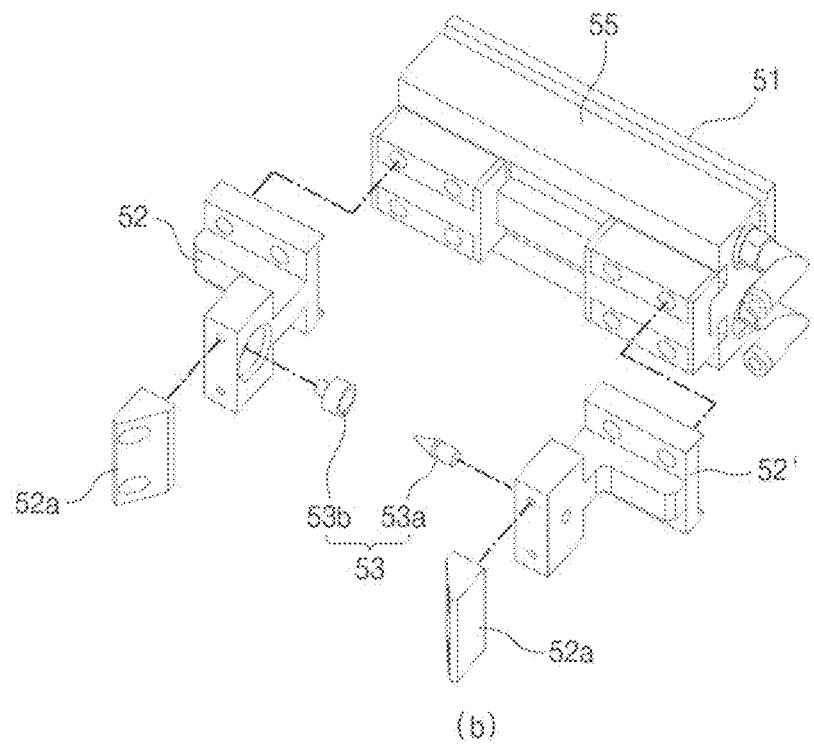
(b)

[FIG. 6]
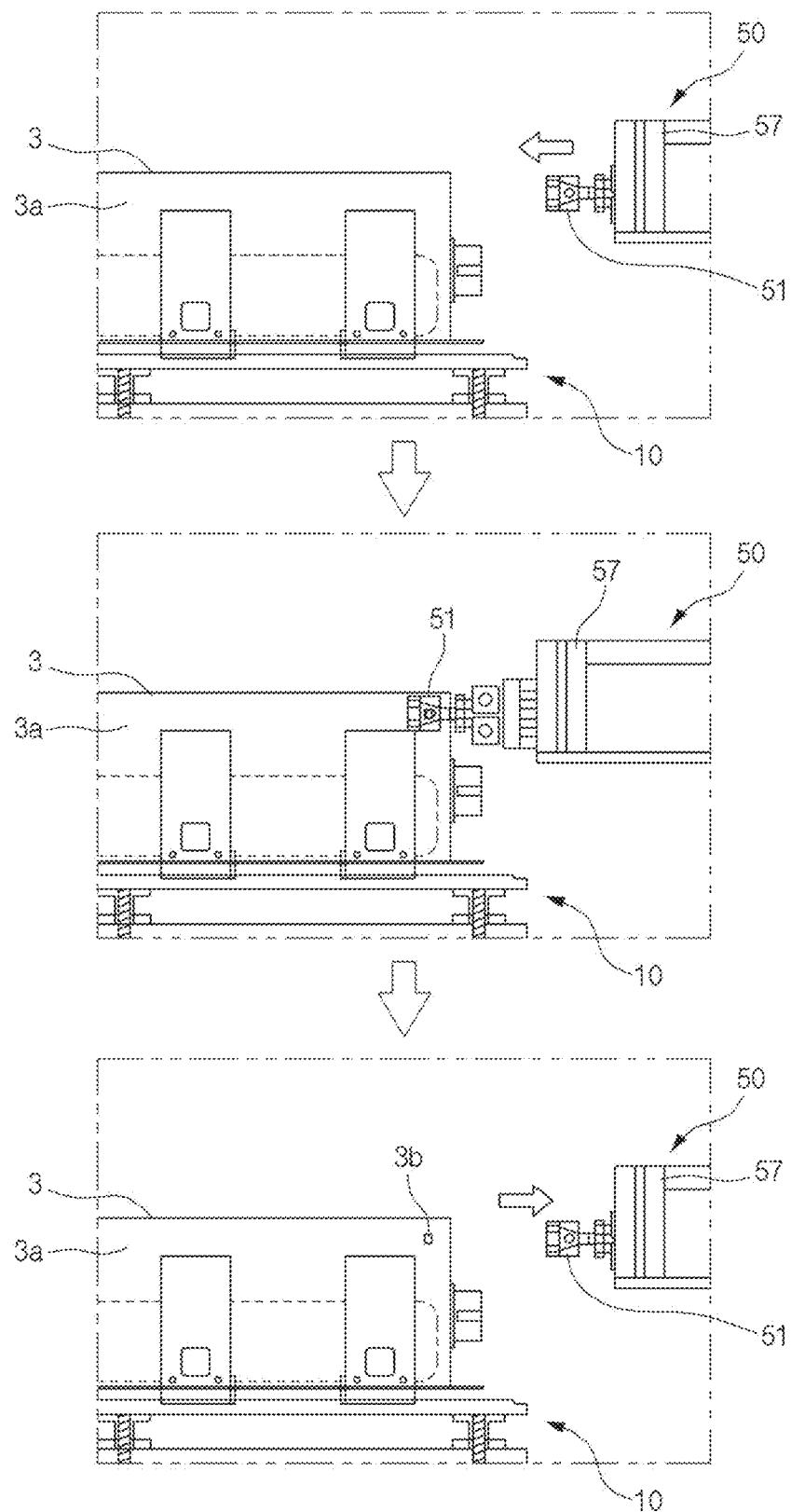

[FIG. 7]
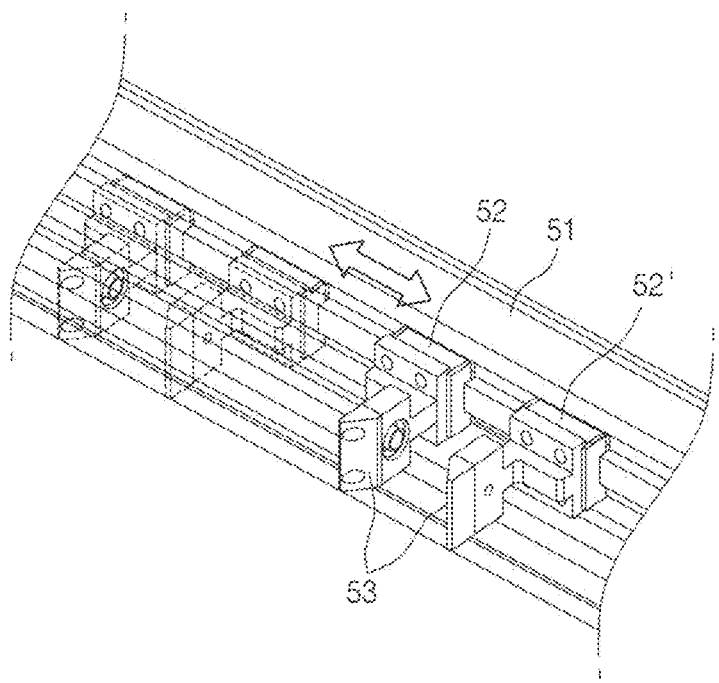
[FIG. 8]
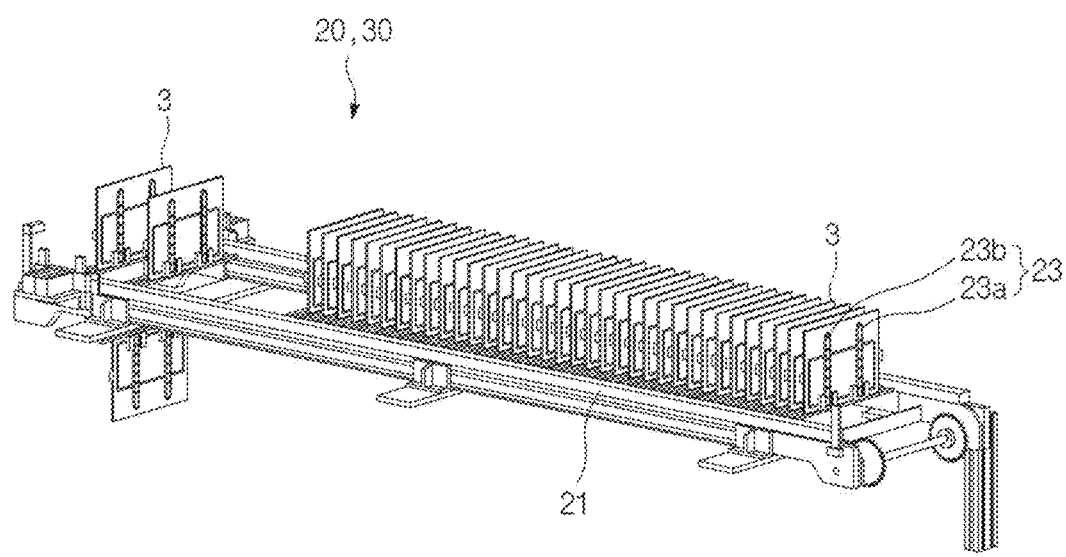

[FIG. 9]
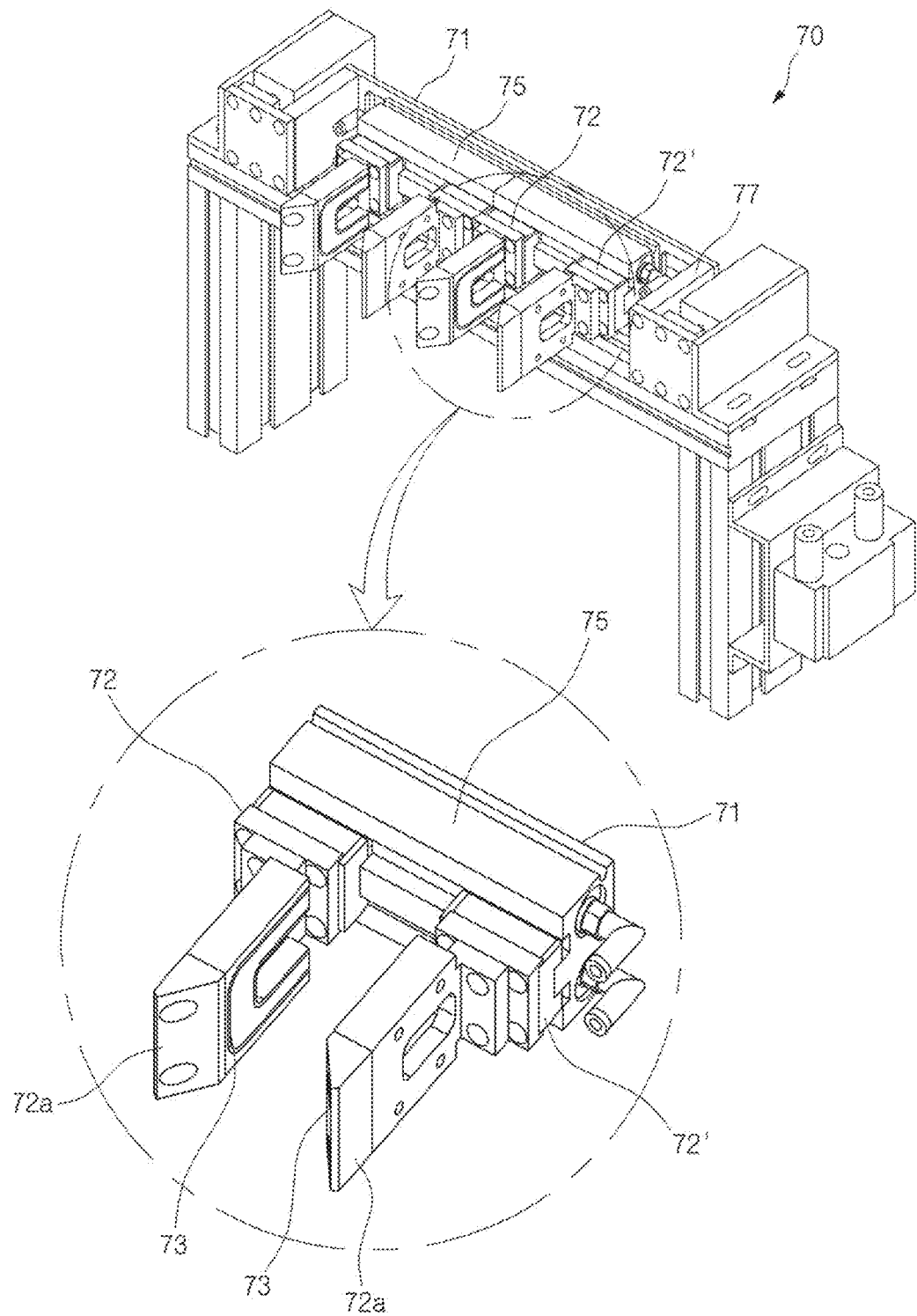

[FIG. 10]
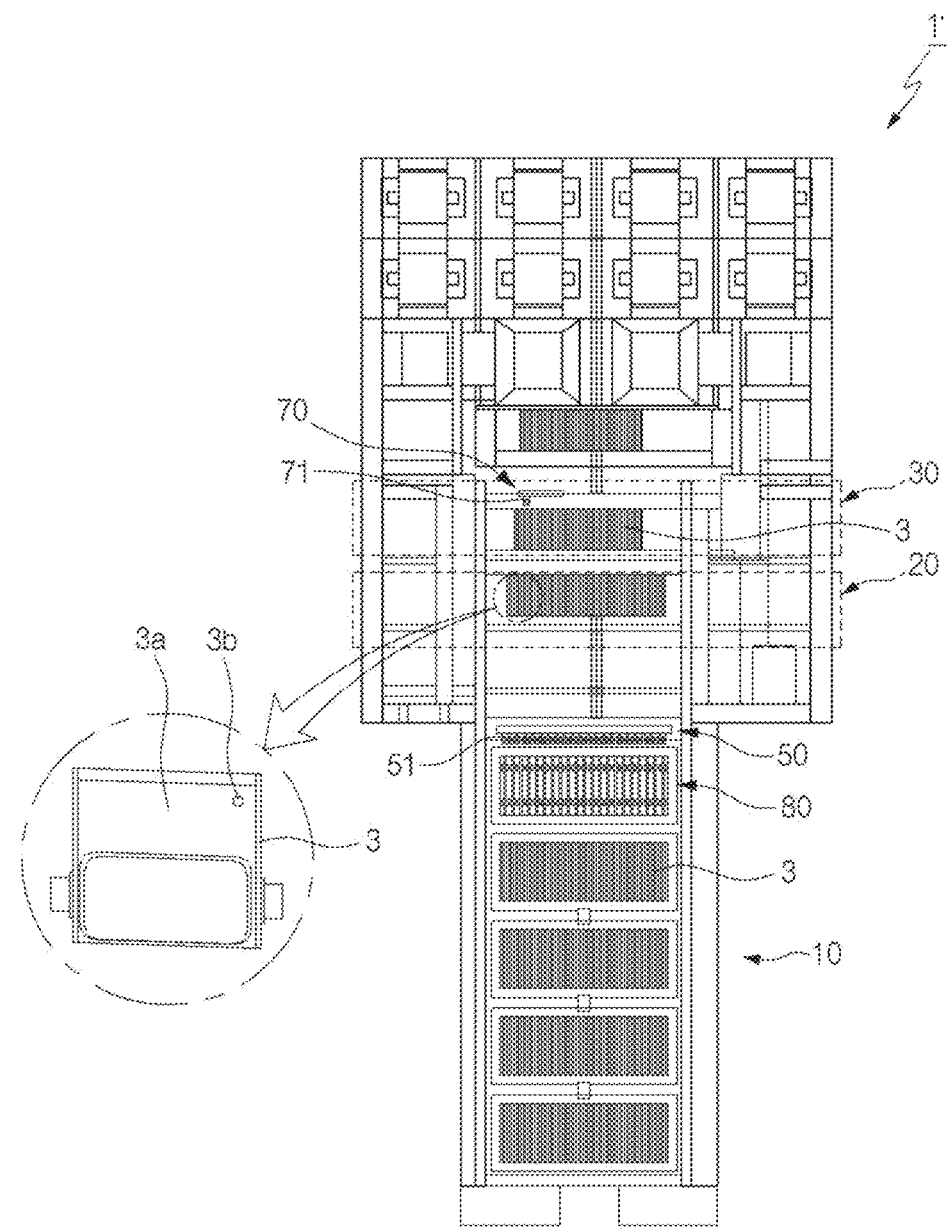

[FIG. 11]
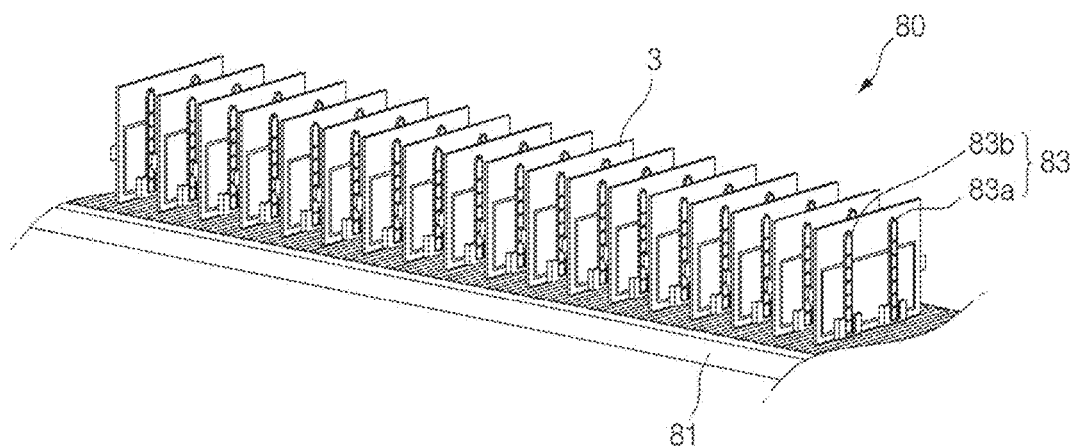
[FIG. 12]
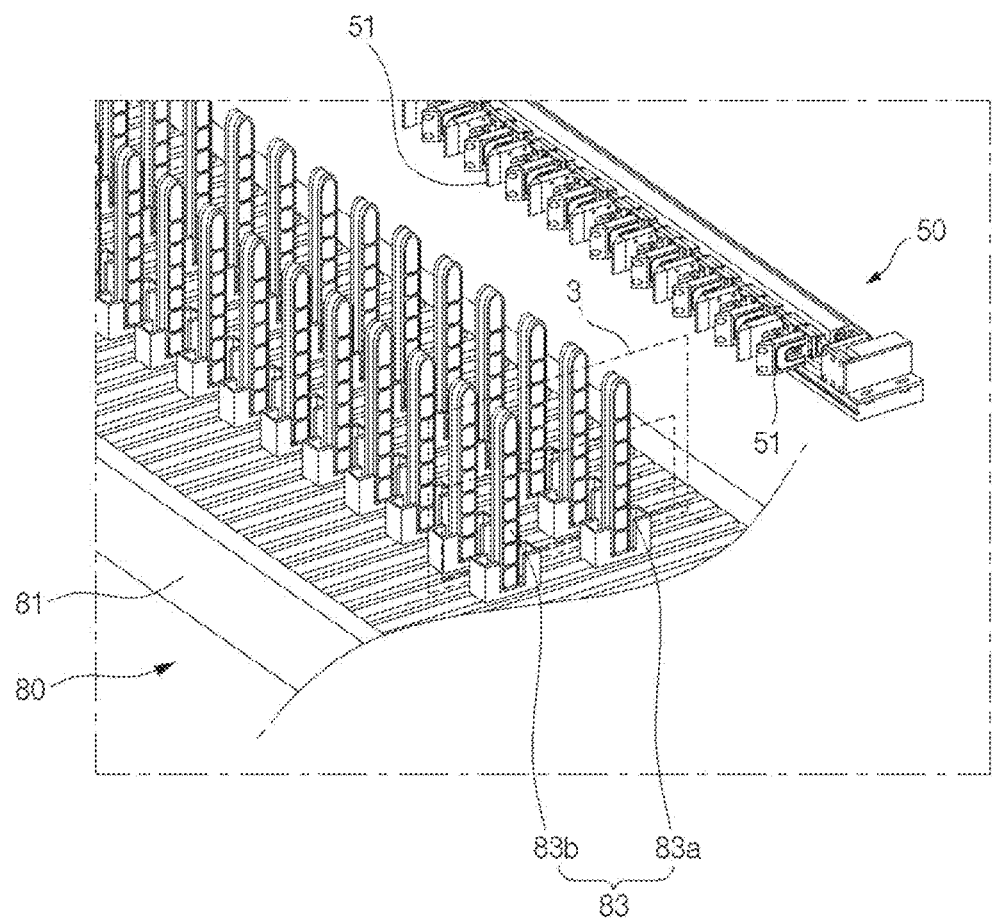

FORMATION DEVICE OF POUCH-TYPE BATTERY CELL

TECHNICAL FIELD

The present invention relates to a formation device for a pouch-type battery cell.

More specifically, the present invention relates to a formation device for a pouch-type battery cell that can prevent electrolyte from being discharged along with gas generated during the formation process of the battery cell.

This application claims the benefit of priority to Korean Patent Application No. 10-2022-0113045, filed on Sep. 6, 2022, the disclosure of which is incorporated herein by reference in its entirety.

Background Technology of the Invention

In general, secondary batteries can be categorized into cylindrical, prismatic, or pouch-type depending on their shape. Among them, pouch-type secondary batteries are attracting a lot of attention because they use a pouch exterior material consisting of a metal layer (foil) and a multilayer film of synthetic resin coated on the upper and lower surfaces of the metal layer to form the exterior, which can significantly reduce the weight of the battery compared to the cylindrical or prismatic type using metal cans, thus enabling the battery to be lightweight, and have the advantage of being able to change into various shapes.

An electrode assembly is stored in these pouch-type secondary batteries in a stacked shape, which has electrode tabs and electrode leads connected to it, with the electrode leads protruding from the pouch exterior material. These electrode leads are electrically connected through contact with an external device to receive power from the external device.

Pouch-type secondary batteries are manufactured by assembling the cells and activating the batteries, and in the battery activation step, the secondary battery cells are mounted on a charge and discharge device and charged and discharged to the conditions required for activation. In this way, the process of performing a predetermined charge and discharge using a charge and discharge device to activate the battery is called the formation process.

During the formation process, both surfaces of the battery cell can be pressurized using a pressurization means such as a zig, which includes a flat, pressure plate during activation charging, and is sometimes referred to as a zig formation.

The jig formation as described above can prevent the expansion of a negative electrode during the activation process, promote the chemical reaction of the battery to induce gas generation, and the generated internal gas is transported to the gas pocket part.

In this case, the electrode assembly is stored in the pouch, an electrolyte is injected and sealed, and during the formation process, gas is generated due to the chemical reaction of the electrolyte and electrodes, which causes the gas pocket part of the pouch-type secondary battery to expand.

If the gas pocket part is overinflated, interference and collision with the transfer means may occur when the battery cells are removed from the jig formation equipment, interference between the battery cells during the transferring process may result in poor battery cell appearance, and excessive pouches are required to create sufficient internal space for the gas pocket part.

In order to solve the above-mentioned problems, during the formation process of a battery cell, a discharge hole is formed in the gas pocket part of the battery cell to discharge the gas generated inside the battery cell, but the process of forming a discharge hole in the battery cell and discharging the gas is complicated, and the process is time-consuming by forming the discharge hole in each battery cell sequentially.

In addition, there was a problem of forming a discharge hole in the gas pocket part of the battery cell, so that when the gas is discharged, the electrolyte is discharged along with the gas due to the increase in the internal pressure of the battery cell, contaminating the outside and causing safety accidents.

PRIOR ART DOCUMENTS

Korean Patent Publication No. 10-2013-0024807

DESCRIPTION OF THE INVENTION

Technical Problem

The present invention was made to solve the above-mentioned problems, and aims to provide a formation device for a pouch-type battery cell in which a hole processing part forming a discharge hole in a gas pocket part of the battery cell is installed in close proximity to a charging part performing charge and discharge to the battery cell to facilitate the formation process.

In addition, it aims to provide a formation device for a pouch-type battery cell capable of stable charge and discharge by performing a partial charge on the pouch-type battery cell, partially expanding the gas pocket part to a predetermined size, forming a discharge hole in the gas pocket part of the battery cell, discharging only the internal gas to the outside without discharging the electrolyte, and naturally discharging the internal gas generated during the process while performing a residual charge on the battery cell in which the discharge hole is formed.

Additionally, the present invention aims to provide a formation device for a pouch-type battery cell that can prevent surrounding contamination by preventing the discharge of electrolyte along with the discharge of gas by discharging only the internal gas generated by the battery cell during the formation process.

Technical Solution

An aspect of the current disclosure may include a formation device of a pouch-type battery cell which may include a charging part configured to charge a battery cell, a loading buffer part configured to receive the battery cell before being placed in the charging part; an unloading buffer part configured to receive the battery cell that has been charged and removed from the charging part; a hole processing part configured to form a discharge hole in a gas pocket part of the battery cell, and a sealing part configured to seal the discharge hole of the battery cell, wherein the battery cell waits on the loading buffer part before being placed into the charging part, and wherein the battery cell waits on the unloading buffer part after the battery cell has been charged and removed from the charging part.

The charging part may be configured to perform a partial charging on the battery cell to partially expand the gas pocket part.

By performing the partial charging on the battery cell to partially expand the gas pocket part, and the discharge hole may be formed in the gas pocket part of the battery cell through the hole processing part.

The charging part may perform residual charging after discharging gas through the discharge hole of the gas pocket part.

The hole processing part may be provided on one side of the charging part and may form the discharge hole in the gas pocket part of the battery cell accommodated in the charging part.

The hole processing part may include a plurality of hole processing units formed correspondingly to a plurality of battery cells arranged in the charging part and configured to form the discharge hole in the gas pocket part of each battery cell, a hole processing unit moving member coupled to each of the hole processing units and configured to move the hole processing unit forward or backward in a direction of the battery cell, and a driving part configured to drive the hole processing unit moving member, wherein the plurality of hole processing units may simultaneously form discharge holes in gas pocket parts of the plurality of battery cells.

The hole processing unit may further include a pair of gas pocket pressing members configured to press the gas pocket part of the battery cell, a hole processing member installed on an inner side of each gas pocket pressing member of the pair of gas pocket pressing members and configured to form a discharge hole on a press surface of the gas pocket part when pressing the gas pocket part, and a hole processing unit body coupled to one side of the pair of gas pocket pressing members and configured to move each gas pocket pressing member in a direction toward or away from each other.

The hole processing part may include a single hole processing unit configured to form the discharge hole in the gas pocket part of the battery cell arranged in the charging part, a hole processing unit moving member coupled to the single hole processing unit and configured to move the single hole processing unit forward or backward in a direction of the battery cell, and a driving part configured to drive the hole processing unit moving member, wherein the single hole processing unit may sequentially form the discharge hole in the gas pocket part of each battery cell.

The hole processing unit may further include a pair of gas pocket pressing members configured to press the gas pocket part of a battery cell, a hole processing member installed on an inner side of each gas pocket pressing member of the pair of gas pocket pressing members and configured to form a discharge hole on a press surface of the gas pocket part when pressing the gas pocket part, and a hole processing unit body coupled to one side of the pair of gas pocket pressing members and configured to move the gas pocket pressing members toward or away from other gas pocket pressing members, wherein each gas pocket pressing member is slidably coupled to the hole processing unit moving member.

An aspect of the current disclosure may further include a hole processing buffer part, wherein a charged battery cell waits to form the discharge hole on the hole processing buffer part.

The hole processing buffer part may include a processing plate, and a plurality of alignment guide members installed by being spaced apart from the processing plate at a certain distance such that the charged battery cell is arranged on an upper part of the processing plate.

The hole processing part may be provided on one side of the hole processing buffer part to form the discharge hole in the gas pocket part of the battery cell accommodated in the hole processing buffer part.

Advantageous Effects

According to the present invention, a hole processing part forming a discharge hole in a gas pocket part of a battery cell is installed in close proximity to a charging part performing charge and discharge to the battery cell, thereby facilitating the formation process.

In addition, by performing a partial charging on the pouch-type battery cell, the vacuum-tight parts of the gas pocket part are partially expanded so that they are spaced apart from each other so that the gas pocket part is not overexpanded, thereby preventing the discharge of electrolyte when a discharge hole is formed in the gas pocket part and stably discharging only internal gas.

In addition, by performing a residual charging after partially charging the battery cell, the internal gas can be discharged through the discharge hole to stably discharge only the internal gas without discharging the electrolyte, thus preventing external contamination.

BRIEF DESCRIPTION OF THE DRAWINGS

FIG. 1 is a plan view schematically illustrating a formation device of a pouch-type battery cell according to an exemplary embodiment of the present invention.

FIG. 2 is a schematic diagram of FIG. 1.

FIG. 3 is a perspective view schematically illustrating a charging part and a hole processing part of a formation device of a pouch-type battery cell according to an exemplary embodiment of the present invention.

FIG. 4 is a perspective view schematically illustrating a hole processing part according to an exemplary embodiment of the present invention.

FIG. 5 is a perspective view schematically illustrating a hole processing unit of a hole processing part according to an exemplary embodiment of the present invention.

FIG. 6 is a diagram schematically illustrating the operation process of the hole processing part according to an exemplary embodiment of the present invention.

FIG. 7 is a perspective view schematically illustrating one variant of a hole processing part according to an exemplary embodiment of the present invention.

FIG. 8 is a perspective view schematically illustrating a loading buffer part/unloading buffer part according to an exemplary embodiment of the present invention.

FIG. 9 is a perspective view schematically illustrating a sealing part according to an exemplary embodiment of the present invention.

FIG. 10 is a plan view schematically illustrating a formation device of a pouch-type battery cell according to another exemplary embodiment of the present invention.

FIG. 11 is a perspective view schematically illustrating a hole processing buffer part of a formation device of a pouch-type battery cell according to another exemplary embodiment of the present invention.

FIG. 12 is a perspective view schematically illustrating a hole processing buffer part and a hole processing part of a formation device of a pouch-type battery cell according to another exemplary embodiment of the present invention.

BEST MODE FOR CARRYING OUT THE INVENTION

The following is a detailed description of the present invention. It should be noted that the terms or words used in this specification and the claims of the patent are not to be construed in their ordinary or dictionary sense, but rather in a sense and concept consistent with the technical idea of the invention, based on the principle that the inventor may properly define the concept of a term to best describe his invention.

The terms "comprise," "include" and "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

First Embodiment

*FIG. 1 is a plan view schematically illustrating a formation device of a pouch-type battery cell according to an exemplary embodiment of the present invention. FIG. 2 is a schematic diagram of FIG. 1. FIG. 3 is a perspective view schematically illustrating a charging part and a hole processing part of a formation device of a pouch-type battery cell according to an exemplary embodiment of the present invention. FIG. 4 is a perspective view schematically illustrating a hole processing part according to an exemplary embodiment of the present invention. FIG. 5 is a perspective view schematically illustrating a hole processing unit of a hole processing part according to an exemplary embodiment of the present invention. FIG. 6 is a diagram schematically illustrating the operation process of the hole processing part according to an exemplary embodiment of the present invention. FIG. 7 is a perspective view schematically illustrating one variant of a hole processing part according to an exemplary embodiment of the present invention. FIG. 8 is a perspective view schematically illustrating a loading buffer part/unloading buffer part according to an exemplary embodiment of the present invention. FIG. 9 is a perspective view schematically illustrating a sealing part according to an exemplary embodiment of the present invention.

As shown in the drawings, a formation device 1 of a pouch-type battery cells according to an exemplary embodiment of the present invention is configured by including a charging part 10 for charging a battery cell 3, a loading buffer part 20 where a battery cell 3 waits prior to being loaded into the charging part 10, an unloading buffer part 30 where a battery cell 3 waits that has been charged and taken out from the charging part 10, and a hole processing part 50 for forming a discharge hole 3b in a gas pocket part 3a of the battery cell 3, and a sealing part 70 for sealing the discharge hole 3b of the battery cell 3.

The charging part 10 is for activating the battery cell 3 by charging and discharging the battery cell 3 to a set charge and discharge condition, and includes a frame 12 for accommodating the battery cell 3, a charging part (not shown) for charging and discharging the battery cell 3, and a pressure jig 11 for pressing the battery cell 3.

The pressure jig 11 may include a jig frame 13, a plurality of pressure plates 15 disposed inside the jig frame 13, and a driving part 16 that drives the plurality of pressure plates 15.

Between each of the pressure plates 15, a battery cell 3 for performing the formation process may be disposed.

Here, the driving part 16 includes a drive motor 16a and a drive shaft 16b, and when the drive shaft 16b is rotated by the rotation of the drive motor 16a, the plurality of pressure plates 15 engaged therewith move unidirectionally, thereby enabling pressurization of both sides of the battery cell 3.

The loading buffer part 20 is a space provided for the battery cells 3 to wait before being loaded into the charging part 10, and the battery cells 3 are reloaded into the loading buffer part 20 by a loader/unloader 90.

Here, the loading buffer part 20 includes a transfer part 21 for transferring the battery cells 3, and a plurality of alignment guide members 23 installed at certain distance apart along the transfer direction of the battery cells 3 so that a plurality of battery cells 3 are arranged in an upright state.

In this case, the upright state of the battery cell 3 means that the gas pocket part 3a is positioned in the upper side and the electrode assembly storing part (not shown) is positioned in the lower side.

The loading buffer part 20 is a structure in which the battery cell 3 is inserted into a gap space between one alignment guide member 23 among the plurality of alignment guide members 23 and another alignment guide member 23 adjacent thereto.

To this end, the alignment guide member 23 may include a pair of guide bars 23a, 23b, spaced apart from each other such that one guide bar 23a may support the right side of the battery cell 3 and the other guide bar 23b may support the left side of the battery cell 3.

At this time, the guide bars 23a, 23b may have a predetermined width and may extend in the height direction of the battery cell 3. Furthermore, the height of the guide bars 23a, 23b may be slightly higher or lower than the height of the battery cell 3, and is preferably located in an area where the hole processing unit 51 of the hole processing part 50 described later can approach the gas pocket part 3a of the battery cell 3 and avoid interference with the hole processing unit 51 during formation of the discharge hole 3b.

The unloading buffer part 30 is a space provided for the battery cells 3 that have been unloaded from the charging part 10 to wait after the formation process is completed, so that the sealing process can proceed through the sealing part 70 described below, and they may be unloaded from the formation device 1 by the loader/unloader 90 upon completion of the sealing process.

Here, since the unloading buffer part 30 is identical to the configuration of the loading buffer part 20, the detailed description of the unloading buffer part 30 will be replaced by the description of the loading buffer part 20, and the detailed description will be omitted hereinafter.

The hole processing part 50 is for forming a discharge hole 3b in the gas pocket part 3a of the battery cell 3 to discharge the internal gas of the battery cell 3.

Here, the hole processing part 50 is provided on one side of the charging part 10 to form a discharge hole 3b in the gas pocket part 3a of the battery cell 3 accommodated in the charging part 10.

Specifically, the hole processing part 50 includes a plurality of hole processing units 51 formed correspondingly to the battery cells 3 arranged in the charging part 10 to form a discharge hole 3b in the gas pocket part 3a of each battery cell 3, a hole processing unit moving member 57 coupled to each of the hole processing units 51 to move the hole processing units 51 forward and backward in the direction of the battery cells 3, and a driving part (not shown) to drive the hole processing unit moving member 57.

In this case, the hole processing units 51 are formed in a plurality corresponding to the battery cells 3 arranged in the charging part 10, so that the plurality of hole processing units 51 can simultaneously form the discharge holes 3b in the gas pocket parts 3a of the battery cells 3.

Here, the hole processing unit moving member 57 is configured to move forward in the direction of the battery cell 3 to perform a hole processing process on the battery cell 3 with the hole processing unit 51, or to move backward to its original position after completion of the hole processing process, and to this end, the hole processing unit moving member 57 may be made of a sliding structure or a cylinder structure capable of moving forward and backward in the direction of the battery cell 3. Since the above structure is a general configuration, a detailed description will be omitted hereinafter.

Meanwhile, the hole processing unit 51 includes a pair of gas pocket pressing members 52, 52' for pressing the gas pocket part 3a of the battery cell 3, and a hole processing member 53 installed on the inner side of the gas pocket pressing members 52, 52', respectively, so that when the gas pocket part 3a is pressed with the gas pocket pressing members 52, 52', a portion of the press surface is penetrated to form a discharge hole 3b, and a hole processing unit body 55 in which the pair of gas pocket pressing members 52, 52' is movably installed facing the gas pocket part 3a, wherein the hole processing unit body 55 is connected to a hole processing unit moving member 57 to be moved forward and backward in the direction of the battery cell 3.

Here, the gas pocket pressing member 52, 52' is for pressing and fixing the gas pocket part 3a of the battery cell 3, and the hole processing member 53 presses the battery cell 3 so that the battery cell 3 remains fixed when the discharge hole 3b is formed on the gas pocket part 3a.

And, the hole processing unit body 55 has a side coupled with the gas pocket pressing members 52, 52' connected in a sliding structure to slidingly move the pair of gas pocket pressing members 52, 52' in a direction of moving closer to each other or in a direction of moving further away from each other.

As a result, the gas pocket pressing members 52, 52' slide in the direction of moving closer to each other when pressing the gas pocket part 3a, and slide in the direction of moving away from each other to release the pressing state when the hole processing process is completed.

Here, the pair of gas pocket pressing members 52, 52' can be sealed with the gas pocket part 3a interposed therebetween, and in this case, when slidingly moving to press the battery cell 3, the sliding movement can be stopped at a point where the gap between them becomes the thickness length of the gas pocket part 3a.

Meanwhile, the gas pocket pressing member 52, 52' is provided with a press surface on the inner side facing the battery cell 3 for pressing by contacting both sides in the thickness direction of the gas pocket part 3a, and a hole processing member 53 is installed in a portion of the press surface.

Here, the hole processing member 53 is preferably made of a shape or material capable of forming a discharge hole 3b in the gas pocket part 3a, but more preferably, the hole processing member 53 may comprise a horn-shaped member 53a having a pointed end and a horn-shaped member groove 53b forming a recess that is recessed inwardly by at least as much as the pointed part of the horn-shaped member 53a.

Furthermore, the hole processing member 53 may be a punching mold, and various other modifications can be made.

Meanwhile, the gas pocket pressing members 52, 52' may be coupled with a pressure pad 52a having an elasticity at an extending part on one side thereof to prevent damage to the battery cell 3 when pressing the battery cell 3. Here, the extending part on one side refers to a portion of the one side extending from the gas pocket pressing member 52, 52' toward the battery cell 3.

In accordance with the structure as described above, the gas pocket pressing members 52, 52' are moved forward and backward toward the battery cell 3 by the movement of the hole processing unit moving member 57, and the pair of gas pocket pressing members 52, 52" moved forward toward the battery cell 3 are moved toward the gas pocket part 3a of the battery cell 3 in a direction that brings them closer to each other, and then a discharge hole 3b can be formed in the gas pocket part 3a with the hole processing member 53 while pressing the gas pocket part 3a, and through the plurality of gas pocket pressing members 52, 52' and respective hole processing members 53 formed thereon, it is possible to simultaneously form a discharge hole 3b in the gas pocket part 3a of a plurality of battery cells 3 arranged in the charging part 10.

In an exemplary embodiment of the present invention, a hole processing unit 51 of the hole processing part 50 is formed in plurality to simultaneously form a gas pocket part 3a for a plurality of battery cells 3 arranged in the charging part 10, but as shown in FIG. 7, a hole processing unit 51 of the hole processing part 50 is provided as one, but it is also possible that the hole processing unit body 55, which is coupled to a pair of gas pocket pressing members 52, 52' of the hole processing unit 51, is slidably movably coupled to the longitudinal direction of the hole processing unit moving member 57 to move the gas pocket pressing members 52, 52' toward or away from each other, so that the hole processing unit 51 sequentially forms a discharge hole 3b in the gas pocket part 3a of each battery cell 3.

In this case, the gas pocket pressing member 52, 52' is moved forwardly toward the battery cell 3 via the hole processing unit moving member 57 to form a discharge hole 3b in the gas pocket part 3a of one of the battery cells 3, and after forming the discharge hole 3b, it is moved backwardly to return to its original position, and the hole processing unit body 55 is moved on the hole processing unit moving member 57, and it moves in the thickness direction of the battery cell 3 and then moves forwardly toward the battery cell 3 via the hole processing unit moving member 57, such as forming the discharge hole 3b in the gas pocket part 3a of the other battery cell 3, and the hole processing unit body 55 moves forwardly/backwardly toward the battery cell 3 via the hole processing unit moving member 57, and the hole processing unit body 55 slidingly moves on the hole processing unit moving member 57 to form a discharge hole 3b in the gas pocket part 3a of the battery cell 3, so that the discharge hole 3b can be formed sequentially in the battery cell 3.

The sealing part 70 is for sealing the discharge hole 3b formed in the gas pocket part 3a of the battery cell 3. In the present invention, the meaning of sealing the discharge hole 3b includes sealing the discharge hole 3b by sealing the discharge hole 3b or sealing the periphery of the discharge hole 3b.

Specifically, the sealing part 70 includes a sealing unit 71 for sealing the discharge hole 3b while pressing both sides of the gas pocket part 3a, a sealing unit moving member 77 coupled to one side of the sealing unit 71 for moving the sealing unit 71 forwardly or backwardly in the direction of the battery cell 3, and a driving part (not shown) for driving the sealing unit moving member 77.

Here, the sealing unit 71 is installed on each inner side of the pair of discharge hole press members 72, 72' which presses the discharge hole 3b and its periphery, and the pair of discharge hole press members 72, 72', and when the discharge hole press member 72, 72' is used to press the discharge hole 3b and its periphery, a pair of sealing members 73 for sealing the discharge hole 3b or a periphery thereof, and the pair of discharge hole press members 72, 72' include a sealing unit body 75 movably installed toward the discharge hole 3b, wherein the sealing unit body 75 is connected to a sealing unit moving member 77 to move forwardly and backwardly in the direction of the battery cell 3.

Here, the discharge hole press members 72, 72' are for pressing and fixing the discharge hole 3b of the gas pocket part 3a, and they press the battery cell 3 so that the battery cell 3 remains fixed when the discharge hole 3b is sealed with the sealing member 73.

And, the sealing unit body 75 connected in a sliding structure on the side that is coupled to the discharge hole press members 72, 72' to slidingly move the pair of discharge hole press members 72, 72' in the direction of moving closer to each other or further away from each other.

As a result, the discharge hole press members 72, 72' slide in a direction toward each other when pressing the discharge hole 3b or its surroundings, and slide in a direction away from each other to release the pressed state when the sealing process is completed.

According to the structure as described above, the battery cell 3 can be pressed with the discharge hole pressing member 72, 72' to keep the battery cell 3 in a fixed state, and then the discharge hole pressing member 72, 72' can press and seal the discharge hole 3b of the battery cell 3 and its surroundings.

Here, the sealing part 70 is preferably provided on one side of the unloading buffer part 30 and is configured to seal the discharge hole 3b formed in the gas pocket part 3a of the charged battery cell 3, but is not limited thereto.

It is also possible, but not limited to, that the sealing unit 71 of the sealing part 70 is formed in plurality to seal the discharge holes 3b of a plurality of battery cells 3 arranged in the unloading buffer part 30.

Meanwhile, the pair of sealing members 73 comprises a pair of sealing tools (not shown) for sealing the periphery of the discharge hole 3b, so as to heat-seal the pouch by heat-pressing the periphery of the discharge hole 3b. The sealing tool may be, but is not limited to, a hard metal material having good thermal conductivity.

Here, the shape of the sealing tool may be varied, and the sealing tool may be "U" shaped, "-" shaped, "L" shaped, "⊂" shaped, etc. so that sealing in and around the discharge hole 3b is advantageous, and various methods disclosed at the time of filing of the present invention may be employed, without being limited to these embodiments.

Meanwhile, the sealing member 73 may comprise a tape that seals the area including the discharge hole 3b, and may be configured to bond the discharge hole 3b.

In this case, the discharge hole pressing members 72, 72' may be coupled with a pressure pad 72a having an elasticity at one extending part thereof to prevent damage to the pouch during pressing.

Here, since the operation process of the sealing part 70 approaching the battery cell 3 is the same as the operation process of the hole processing part 50 approaching the battery cell 3, the description of operation process of the sealing part 70 will be replaced, and the following detailed description will be omitted.

Meanwhile, in order to discharge the internal gas generated in the battery cell 3 to the outside during the formation process of the pouch-type battery cell through the formation device according to the present invention, the upper part of the formation device may include an air supply part (not shown) and a gas exhaust part (not shown).

The air supply part is arranged to introduce and supply air from the outside into the formation device, and the gas exhaust part is configured to discharge gas generated during the formation process to the outside.

Hereinafter, the operation process of the formation device of a pouch-type battery cell according to an exemplary embodiment of the present invention will be described schematically with reference to the drawings.

First, the manufactured pouch-type battery cell 3 is supplied to the loading buffer part 20, and the battery cell 3 supplied to the loading buffer part 20 is supplied to the charging part 10 to perform charging and discharging.

The battery cell 3 supplied to the charging part 10 performs a predetermined charge and discharge using a charge and discharge device to activate the battery.

Specifically, the battery cell 3 supplied to the charging part 10 performs a partial charging to partially expand the gas pocket part 3a.

In this case, the partial charging may be performed at 50% or less of the total charging capacity of the battery cell 3.

In this way, the gas pocket part 3a of the battery cell 3 is partially expanded to a predetermined size through the charging part 10, and a discharge hole 3b is formed in the gas pocket part 3a through the hole processing part 50 provided on one side of the charging part 10.

At this time, when the hole processing units 51 of the hole processing part 50 are formed in a plurality corresponding to the battery cells 3 arranged in the charging part 10, all the hole processing units 51 can simultaneously form the discharge hole 3b for all the battery cells 3 arranged in the charging part 10 while moving forward and backward toward the battery cells 3.

In this way, the hole processing part 50 provided on one side of the charging part 10 can move forward toward the battery cells 3 accommodated in the charging part 10 and form a discharge hole 3b in the gas pocket part 3a of all the battery cells 3 arranged in the charging part 10, and after forming the discharge hole 3b in the gas pocket part 3a, it can move backward to return to its original position.

Meanwhile, when the hole processing unit 51 of the hole processing part 50 is provided as one, the hole processing unit 51 moves by sliding forward and backward toward the battery cell 3 corresponding to the movement direction of the battery cell 3 on the hole processing unit moving member 57 to form the discharge hole 3b sequentially in the battery cell 3 arranged in the charging part 10.

As described above, the gas pocket part 3a is arranged in the charging part 10 through the hole processing part 50, but by performing partial charging to form the discharge hole 3b in the partially charged battery cell 3, it is possible to prevent the gas and electrolyte inside the battery cell 3 from being discharged together at the time of forming the discharge hole 3b in the battery cell 3 due to overexpansion of the gas pocket part 3a during charging of the conventional battery cell 3, and to prevent contamination of the formation device by the electrolyte.

In other words, conventionally, when electrolyte is injected into the pouch-type battery cell 3 in the assembly stage, the electrolyte is discharged together with the internal gas of the pouch-type battery cell 3 at the time of discharge due to the vacuum-tight part of the gas pocket part 3a and the internal pressure when the discharge hole 3b is formed, but by partially charging the battery cell 3 through the formation device according to the present invention, the vacuum-tight part of the gas pocket part 3a is expanded to a predetermined size, and the internal pressure of the battery cell 3 is formed to a certain size, and the vacuum-tight part of the gas pocket part 3a is spaced apart so that only the gas excluding the electrolyte can be stably discharged.

And, the charging part 10 performs residual charging after discharging the gas through the discharge hole 3b of the gas pocket part 3a.

That is, through the hole processing part 50 provided on one side of the charging part 10, a discharge hole 3b is formed in the gas pocket part 3a of the partially charged battery cell 3 to discharge only the gas inside the battery cell 3 to the outside, and then a residual charging is performed on the battery cell 3 through the charging part 10.

Here, the gas generated during the residual charging of the battery cell 3 can be stably discharged through the discharge hole 3b of the gas pocket part 3a.

In this case, the residual charging may be up to 70% of the total charge capacity of the battery cell 3.

In this way, after partially charging the battery cell 3, a discharge hole is formed in the partially charged battery cell 3 to discharge only the gas inside the battery cell 3 to the outside, and then, while performing the residual charging, the battery cell 3 can be charged while stably discharging only the gas without discharging the electrolyte by discharging the gas inside the battery cell 3 to the outside again.

As described above, the battery cells 3 having completed the residual charging are transferred from the charging part 10 to the unloading buffer part 30, and the battery cells 3 transferred to the unloading buffer part 30 are configured to seal the discharge hole 3b of each battery cell 3 through the sealing part 70 provided on one side of the unloading buffer part 30.

Then, the battery cell 3 in which the sealing of the discharge hole 3b formed in the gas pocket 3a is completed is transferred to the post-process to be productized.

Second Embodiment

FIG. 10 is a plan view schematically illustrating a formation device of a pouch-type battery cell according to another exemplary embodiment of the present invention. FIG. 11 is a perspective view schematically illustrating a hole processing buffer part of a formation device of a pouch-type battery cell according to another exemplary embodiment of the present invention. FIG. 12 is a perspective view schematically illustrating a hole processing buffer part and a hole processing part of a formation device of a pouch-type battery cell according to another exemplary embodiment of the present invention.

As shown in the drawings, the formation device 1' according to another exemplary embodiment of the present invention may further include a hole processing buffer part 80 in which the charged battery cells 3 wait to form a discharge hole 3b on the charging part 10.

Here, the hole processing buffer part 80 may include a processing plate 81, and a plurality of hole processing alignment guide members 83 installed by being spaced apart at certain distance in the longitudinal direction of the processing plate 81 so that the battery cell 3 is arranged on the upper part of the processing plate 81.

That is, the hole processing buffer part 80 includes a processing plate 81 on which a plurality of battery cells 3 are arranged, and a plurality of hole processing alignment guide members 83 installed at certain distance along the thickness direction of the battery cells 3 so that the battery cells 3 are arranged in an upright state on the processing plate.

Here, the battery cell 3 is inserted and installed in the gap space between one of the hole processing alignment guide members 83 of the plurality of hole processing buffer parts 80 and the other hole processing alignment guide member 83 adjacent thereto.

To this end, the hole processing alignment guide member 83 may include a pair of hole processing guide bars 83a, 83b, which may be spaced apart from each other such that one hole processing guide bar 83a supports the right side of the battery cell 3 and the other hole processing guide bar 83b supports the left side of the battery cell 3.

Meanwhile, as in the present embodiment, when a hole processing buffer part 80 is provided on the charging part 10, as in the present embodiment, a hole processing part 50 is provided on one side of the hole processing buffer part 80 to form a discharge hole 3b in the gas pocket part 3a of the battery cell 3 accommodated in the hole processing buffer part 80.

According to the structure as described above, after being transferred from the loading buffer part 20 to the charging part 10, a partial charging is performed on the charging part 10 to partially expand the gas pocket part 3a of the battery cell 3, and after transferring the partially expanded battery cell 3 to the hole processing buffer part 80, a discharge hole 3b is formed in the gas pocket part 3a of the battery cell 3 accommodated in the hole processing buffer part 80 through the hole processing part 50 provided on one side of the hole processing buffer part 80. The battery cell 3 in which the discharge hole 3b is formed through the hole processing buffer part 80 is transferred to the charging part 10, and then residual charging can be performed on the battery cell 3 through the charging part 10.

Again, when the hole processing units 51 of the hole processing part 50 are formed in a plurality corresponding to the battery cells 3 arranged in the hole processing buffer part 80, all the hole processing units 51 of the hole processing part 50 move forward toward the battery cells 3 and then form the discharge hole 3b while pressing all the battery cells 3 accommodated in the hole processing buffer part 80. After forming the discharge hole 3b in the gas pocket part 3a of all the battery cells 3, all the hole processing units 51 of the hole processing part 50 may again be configured to move backward.

Furthermore, when the hole processing unit 51 of the hole processing part 50 is formed as one, the hole processing unit 51 moves forward toward the battery cell 3 and then moves toward one of the battery cells 3 accommodated in the hole processing buffer part 80, and then the hole processing unit 51 of the hole processing part 50 forms the discharge hole 3*b* while pressing the battery cell 3. After forming the discharge hole 3*b*, it moves backward, then moves toward the battery cell 3 in the thickness direction of the battery cell 3, then moves forward again to form the discharge hole 3*b* in the corresponding battery cell 3, and so on, and the above process may be repeatedly performed to form the discharge hole 3*b* sequentially in all the battery cells 3 arranged in the hole processing buffer part 80.

While the present invention has been shown and described with reference to certain embodiments, it will be readily apparent to one of ordinary skill in the art that various modifications and changes can be made without departing from the ideas and scope of the invention as set forth in the appended claims.

REFERENCE NUMERALS 1, 1': FORMATION DEVICE FOR POUCH-TYPE BATTERY CELLS
3: BATTERY CELL
3*a*: GAS POCKET PART
3*b*: DISCHARGE HOLE
10: CHARGING PART
11: PRESSURE JIG
12: FRAME
13: JIG FRAME
15: PRESSURE PLATE
16: DRIVING PART
16*a*: DRIVE MOTOR
16*b*: DRIVE SHAFT
20: LOADING BUFFER PART
21: TRANSFER PART
23: ALIGNMENT GUIDE MEMBER
23*a*, 23*b*: GUIDE BAR
30: UNLOADING BUFFER PART
50: HOLE PROCESSING PART
51: HOLE PROCESSING UNIT
52, 52': GAS POCKET PRESSING MEMBER
52*a*: PRESSURE PAD
53: HOLE PROCESSING MEMBER
53*a*: HORN-SHAPED MEMBER
53*b*: HORN-SHAPED MEMBER GROOVE
55: HOLE PROCESSING UNIT BODY
57: HOLE PROCESSING UNIT MOVING MEMBER
70: SEALING PART
71; SEALING UNIT
72, 72': DISCHARGE HOLE PRESS MEMBER
72*a*: PRESSURE PAD
73: SEALING MEMBER
75: SEALING UNIT BODY
77: SEALING UNIT MOVING MEMBER
80: HOLE PROCESSING BUFFER PART
81: PROCESSING PLATE
83: HOLE PROCESSING ALIGNMENT GUIDE MEMBER
83*a*, 83*b*: HOLE PROCESSING GUIDE BAR
90: LOADER/UNLOADER

The invention claimed is:

1. A formation device of a pouch-type battery cell, the formation device comprising:
a charging part configured to charge a battery cell;
a loading buffer part configured to receive the battery cell before being placed in the charging part;
an unloading buffer part configured to receive the battery cell that has been charged and removed from the charging part;
a hole processing part configured to form a discharge hole in a gas pocket part of the battery cell; and
a sealing part configured to seal the discharge hole of the battery cell.

2. The formation device of claim 1, wherein the charging part is configured to perform a partial charging on the battery cell to partially expand the gas pocket part.

3. The formation device of claim 2, wherein, when the partial charging of the battery cell is performed to partially expand the gas pocket part, the discharge hole is formed in the gas pocket part of the battery cell through the hole processing part.

4. The formation device of claim 3, wherein the charging part performs residual charging after discharging gas through the discharge hole of the gas pocket part.

5. The formation device of claim 1, wherein the hole processing part is provided on one side of the charging part and forms the discharge hole in the gas part of the battery cell accommodated in the charging part.

6. The formation device of claim 5, wherein the hole processing part comprises:
a plurality of hole processing units formed correspondingly to a plurality of battery cells arranged in the charging part and configured to form the discharge hole in the gas pocket part of each battery cell;
a hole processing unit moving member coupled to each of the hole processing units and configured to move the hole processing unit forward or backward in a direction of the battery cell; and
a driving part configured to drive the hole processing unit moving member,
wherein the plurality of hole processing units simultaneously forms discharge holes in gas pocket parts of the plurality of battery cells.

7. The formation device of claim 6, wherein the hole processing unit further comprises:
a pair of gas pocket pressing members configured to press the gas pocket part of the battery cell;
a hole processing member installed on an inner side of each gas pocket pressing member of the pair of gas pocket pressing members and configured to form a discharge hole on a press surface of the gas pocket part when pressing the gas pocket part; and
a hole processing unit body coupled to one side of the pair of gas pocket pressing members and configured to move each gas pocket pressing member in a direction toward or away from each other.

8. The formation device of claim 5, wherein the hole processing part comprises:
a single hole processing unit configured to form the discharge hole in the gas pocket part of the battery cell arranged in the charging part,
a hole processing unit moving member coupled to the single hole processing unit and configured to move the single hole processing unit forward or backward in a direction of the battery cell; and
a driving part configured to drive the hole processing unit moving member,
wherein the single hole processing unit sequentially forms the discharge hole in the gas pocket part of each battery cell.

9. The formation device of claim 8, wherein the hole processing unit further comprises:

a pair of gas pocket pressing members configured to press the gas pocket part of a battery cell;

a hole processing member installed on an inner side of each gas pocket pressing member of the pair of gas pocket pressing members and configured to form a discharge hole on a press surface of the gas pocket part when pressing the gas pocket part; and a hole processing unit body coupled to one side of the pair of gas pocket pressing members and configured to move the gas pocket pressing members toward or away from each other, wherein each gas pocket pressing member is slidably coupled to the hole processing unit moving member.

10. The formation device of claim 1, further comprising a hole processing buffer part, wherein a charged battery cell waits to form the discharge hole on the hole processing buffer part.

11. The formation device of claim 10, wherein the hole processing buffer part comprises:

a processing plate; and a plurality of alignment guide members installed by being spaced apart from the processing plate at a certain distance such that the charged battery cell is arranged on an upper part of the processing plate.

12. The formation device of claim 10, wherein the hole processing part is provided on one side of the hole processing buffer part to form the discharge hole in the gas pocket part of the battery cell accommodated in the hole processing buffer part.

* * * * *